United States Patent [19]

Ushioda et al.

[11] 4,329,187
[45] May 11, 1982

[54] APPARATUS AND METHOD FOR CUTTING CONTINUOUS METAL SHEET BY MELTING PORTION THEREOF AND TRIMMING END OF CUT SHEET

[75] Inventors: Bunnosuke Ushioda, Hoya; Nobuyasu Nakamura, Yokohama, both of Japan

[73] Assignee: Nippon Speng Co., Ltd., Tokyo, Japan

[21] Appl. No.: 213,686

[22] Filed: Dec. 5, 1980

[30] Foreign Application Priority Data

Dec. 29, 1979 [JP]  Japan ................................ 54-170818
Dec. 29, 1979 [JP]  Japan ................................ 54-170819
Mar. 19, 1980 [JP]  Japan ................................ 55-35040

[51] Int. Cl.³ .......................... B23K 7/02; B23K 7/08
[52] U.S. Cl. ................................... 148/9 R; 266/49; 266/50
[58] Field of Search .............. 148/9 R, 9.5; 266/49, 266/50, 51

[56] References Cited

U.S. PATENT DOCUMENTS

2,289,786  7/1942  Jones .................................... 266/49
2,301,923  11/1942  Babcock ............................... 266/49

Primary Examiner—W. Stallard

[57] ABSTRACT

A trimming apparatus comprises a trimming mechanism including a carriage movable along the path of travel of a sheet segment which has been cut from a continuous metal sheet by melting a localized area thereof, a slag being formed on an end of the sheet segment. An engaging member is mounted on the carriage and engageable with the sheet segment. A burner is mounted on the carriage and movable along the end of the sheet segment to remove the slag therefrom. There is also disclosed a method of cutting a continuous metal sheet by melting a localized area thereof, and trimming the end of the cut sheet.

13 Claims, 12 Drawing Figures

APPARATUS AND METHOD FOR CUTTING CONTINUOUS METAL SHEET BY MELTING PORTION THEREOF AND TRIMMING END OF CUT SHEET

BACKGROUND OF THE INVENTION

1. Field of the Invention

This invention relates generally to the art of cutting a sheet or slab of ferrous metal by melting a localized area thereof and more particularly to the art of trimming the end of the thus cut sheet.

2. Prior Art

Conventionally, in a process for continuously casting a sheet of steel, the sheet maintained at a temperature of 500° C. to 900° C. is cut to a desired length by a cutting torch, for example, of the type having concentric conduits feeding a fuel gas and oxygen gas, respectively, generally, the sheet being disposed horizontally. In gas cutting, a kerf or cut is formed in the sheet along the path of movement of the cutting torch. The sheet must be cut at a relatively low speed to ensure that the metal removed from the kerf can be sufficiently oxidized by the oxygen gas, emitting from the cutting torch, to produce a porous slag or oxides of the metal formed on the lower edge of the end of the sheet, which porous slag can be easily removed to trim the end of the thus cut sheet. Where a sheet of steel having a thickness of 200 to 300 mm is employed, the cutting speed should preferably be kept to a low level of 150 to 250 mm per minute. With this cutting speed, the slag formed on the lower edge of the end of the sheet is of such a porous construction that the slag can be easily crashed. There are even occasions when such a slag is hardly formed on the end of the sheet with such cutting speed. If the steel sheet is cut by the cutting torch at a high speed of 600 to 1000 mm per minute or more, the slag formed on the end of the so cut sheet fails to be adequately oxidized so that the slag is non-porous and metallic. The slag of such a construction can not easily be crashed or removed. If the sheet with such non-porous slag is delivered for processing at later stages such as rolling, the slag would impair the delivery rolls and the pressure rolls. And besides, the so impaired pressure rolls would, in turn, impair the subsequently fed sheet. It has now been desired to continuously cast a steel sheet at a higher speed to increase productivity and save energy. This also necessitates the cutting of the continuously delivered sheet at a higher speed.

SUMMARY OF THE INVENTION

It is therefore an object of this invention to provide a method and apparatus for efficiently trimming the end of a metal sheet which has been cut by melting a localized area thereof.

According to a first aspect of the invention, there is provided a trimming apparatus for removing a slag formed on an end of a sheet segment which has been cut from a continuous metal sheet by melting a localized area thereof, said apparatus comprising: means for advancing the sheet segment; and a trimming mechanism including a carriage movable along the path of travel of the sheet segment, and a burner mounted on the carriage and movable along the end of the sheet segment to remove the slag therefrom.

According to a second aspect of the invention, there is provided a method of cutting a continuous metal sheet and trimming the end of the cut sheet, said method comprising the steps of: cutting a sheet segment from the continuous metal sheet by melting a localized area thereof by a cutting means, while the metal sheet is being moved, a slag being formed on the end of the sheet segment; delivering said sheet segment along a predetermined path; and melting and removing the slag from the end of the sheet segment by a burner movable therealong, while the sheet segment is being delivered.

Alternatively, the sheet segment is delivered and stopped at a predetermined position. Then, the slag is melted and removed from the end of the thus stopped sheet segment by a burner movable along the end. Subsequently, the sheet segment is further delivered.

Other advantages, features and additional objects of the present invention will become manifest to those versed in the art upon making reference to the detailed description and the accompanying sheets of drawings in which preferred embodiments incorporating the principles of the present invention are shown by way of illustrative examples.

DESCRIPTION OF THE PREFERRED EMBODIMENTS

Figure 1:
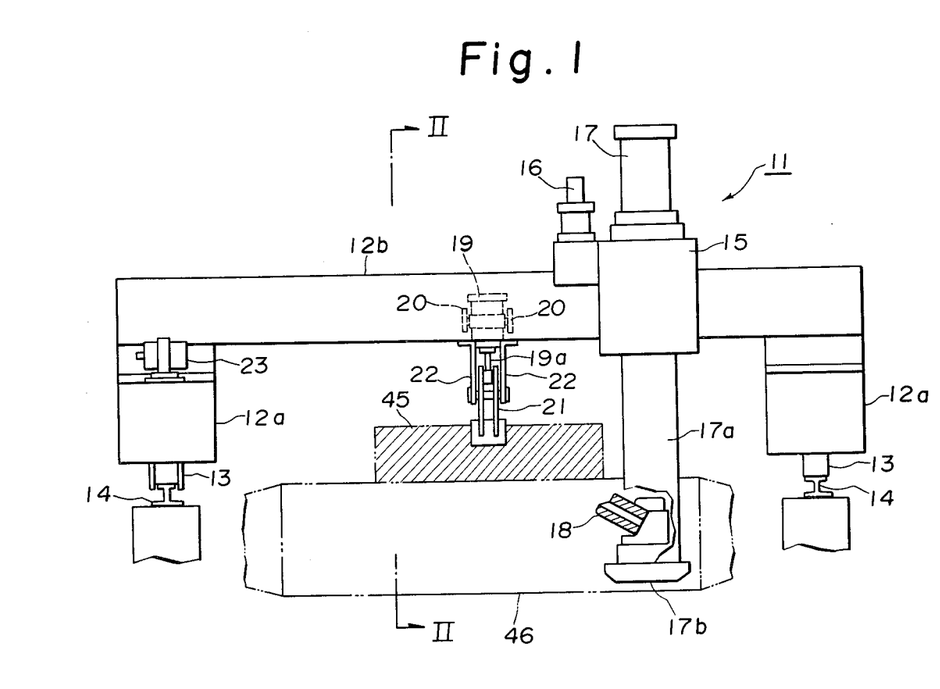
FIG. 1 is a front elevational view of a front trimming mechanism of the invention.
Figure 2:
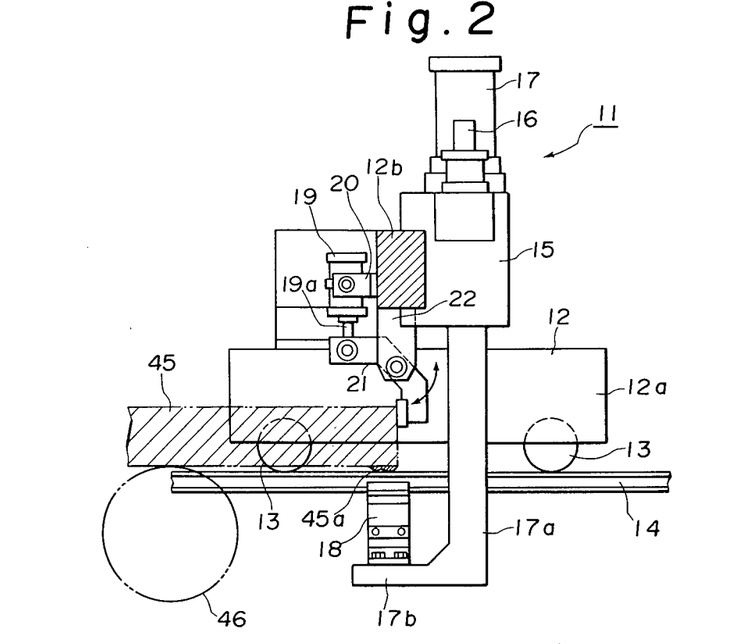
FIG. 2 is a cross-sectional view of the front trimming mechanism taken along the line II—II of FIG. 1.

An apparatus for trimming the end of a metal sheet comprises a front trimming mechanism 11 shown in FIGS. 1 and 2. The front trimming mechanism 11 comprises a carriage 12 having wheels 13 in rolling engagement with a pair of horizontal rails 14, the carriage having a pair of spaced side members 12a, 12a and a cross beam 12b extending therebetween. The cross beam extends perpendicular to the rails 14. A cross slide 15 is mounted on the cross beam 12b and is driven for sliding movement therealong by a reversible motor 16 mounted on the cross slide 15. A pneumatic cylinder 17 is also mounted on the cross slide 15 and has an L-shaped piston member 17a operatively associated therewith, the piston member extending downwardly from the cross slide 15. A burner 18 is mounted on a horizontal portion 17b of the piston member 17a. A pneumatic cylinder 19 is mounted centrally on the cross beam 12b by brackets 20. A generally C-shaped engaging member 21 is pivotally mounted on brackets 22 which in turn is secured to the cross beam 12b, one end of the engaging member 21 being connected to a piston rod 19a of the cylinder 19. A drive motor 23 is mounted on one of the side members 12a for driving the wheels 13.

Figure 3:
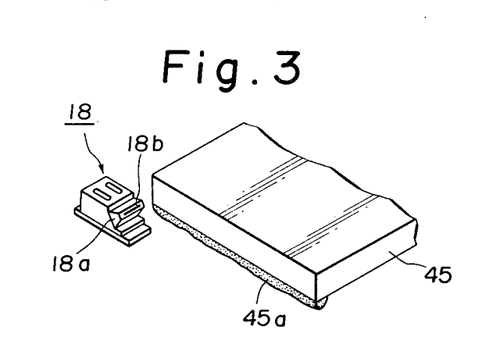
FIG. 3 is a perspective view of a burner as shown in combination with a metal sheet.

As shown in FIG. 3, the burner 18 has a nozzle 18a of a trapezoidal shape which has an orifice 18b in the form of a rectangular opening formed in the flat top surface of the nozzle 18a, the orifice 18b being directed angularly with respect to the body of the burner 18. A fuel gas, such as coke gas, and oxygen gas are fed to the burner. The oxygen gas is supplied in such an amount that a stream of oxygen gas is directed against a steel sheet 45 together with a flame, as will hereinafter more fully described.

Figure 4:
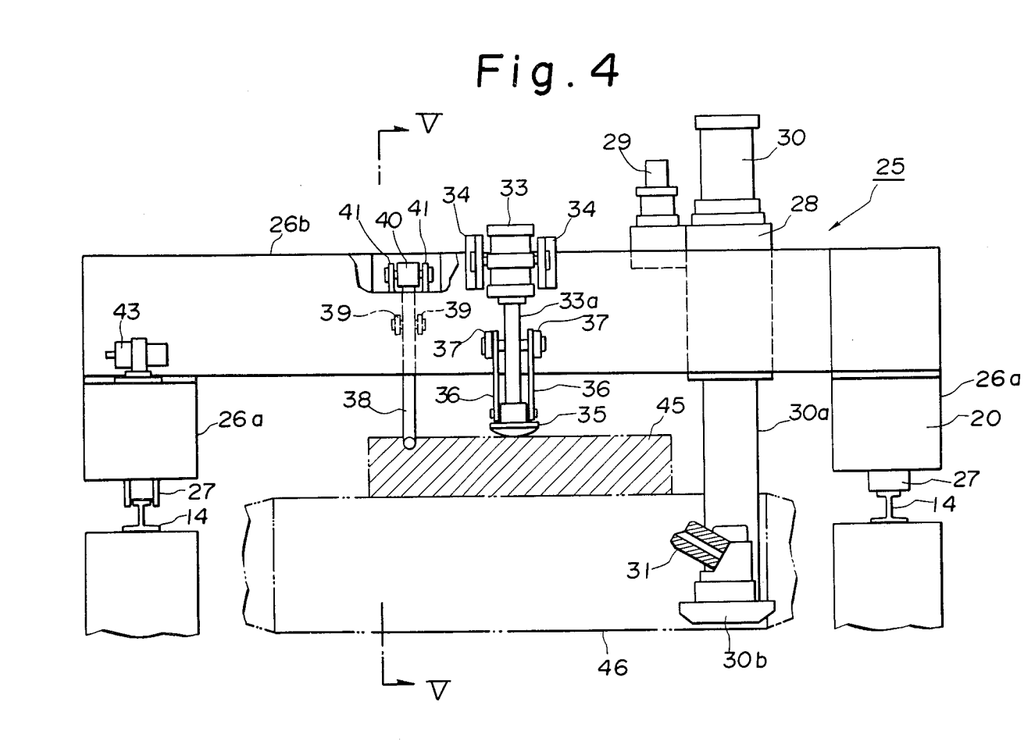
FIG. 4 is a front elevational view of a rear trimming mechanism of the invention.
Figure 5:
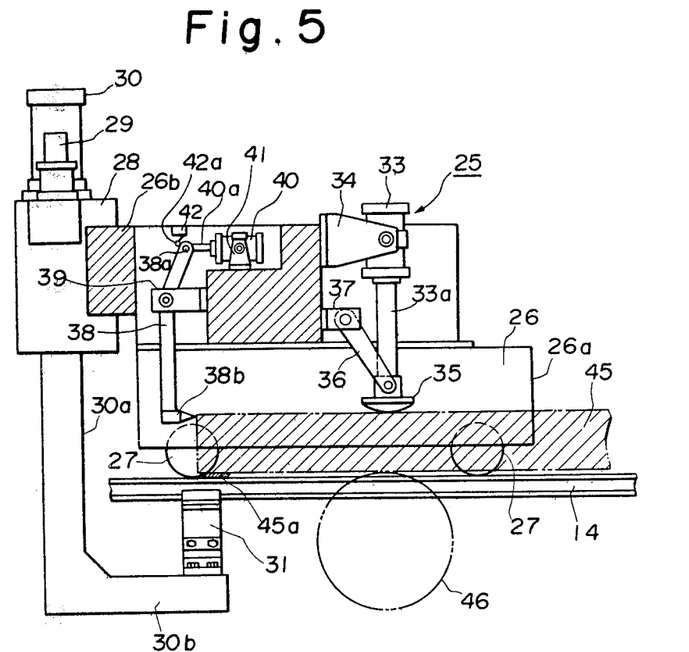
FIG. 5 is a cross-sectional view of the rear trimming mechanism taken along the line V—V of FIG. 4.

The trimming apparatus also includes a rear trimming mechanism 25 shown in FIGS. 4 and 5. The rear trimming mechanism 25 comprises a carriage 26 having wheels 27 in rolling engagement with the pair of rails 14, the carriage having a pair of spaced side members 26a, 26a and a cross beam 26b extending therebetween. The cross beam 26b extends perpendicular to the rails 14. A cross slide 28 is mounted on the cross beam 26b and is driven for sliding movement therealong by a reversible motor 29 mounted on the cross slide 28. A pneumatic cylinder 30 is also mounted on the cross slide 28 and has an L-shaped piston member 30a operatively associated therewith, the piston member extending downwardly from the cross slide 28. A burner 31 is mounted on a horizontal portion 30b of the piston member 30a. The burner 31 is identical in construction to the burner 18. A pneumatic cylinder 33 is mounted centrally on the cross beam 26b by brackets 34, the cylinder 33 being pivotally supported by the brackets 34. An engaging member 35 is secured to the free end of a piston rod 33a of the hydraulic cylinder 33, the engaging member 35 having a rounded head. A pair of links 36 are pivotally connected at their respective ends to the engaging member 35 and brackets 37, the brackets 37 being secured to the cross beam 26b.

A sensing member 38 in the form of a lever is pivotally mounted intermediate its opposite ends on brackets 39 which in turn are secured to the cross beam 26b. A pneumatic cylinder 40 is pivotally mounted on the cross beam 26b through brackets 41, and a piston rod 40a of the cylinder 40 is pivotally connected to one end 38a of the sensing member 38. The other end 38b of the sensing member 38 is directed in a direction of movement of the steel sheet 45. A limit switch 42 is mounted on the carriage 26 and has an actuator 42a with which the end 38a of the sensing member 38 is engageable. A drive motor 43 is mounted on one of the side members 26a for driving the wheels 27.

The sheet of steel 45 gas-cut to a predetermined length is delivered by delivery rolls 46, the path of movement of the sheet 45 being disposed intermediate and along the pair of rails 14.

The front trimming mechanism 11 is first located in a predetermined stand-by position as more fully described hereinafter. The gas-cut sheet 45 is delivered by the delivery rolls 46, and its leading end is brought into engagement with the engaging member 21 which is held in its operative position, as best shown in FIG. 2, so that the front trimming mechanism 11 is pushed by the moving sheet 45 for movement therewith. Upon engagement of the leading end of the sheet 45 with the engaging member 21, the burner 18 is disposed beneath this leading end. During the advancing stroke of the front trimming mechanism 11, the cross slide 15 is driven by the motor 16 to slide along the cross beam 12b, so that the burner 18 moves along the leading end of the sheet 45 to direct the flame and oxygen gas, issuing from the orifice 18a, against the slag 45a formed on the lower edge of the leading end so as to melt and blow off the slag therefrom. Thus, the burner 18 serves to trim the gas-cut end of the sheet 45. After the burner 18 moves along the leading end of the sheet 45 from its one side to the other to complete the trimming operation, the burner 18 stops applying the flame and oxygen gas, and the pneumatic cylinder 19 is actuated to lower the piston rod 19a to angularly move the engaging member 21 in a counterclockwise direction (FIG. 2) so that the engaging member 21 is brought out of contact with the leading end of the sheet 45 to allow the sheet 45 to advance past the front trimming mechanism 11, the sheet 45 being delivered by the delivery rolls 46. Upon completion of the trimming operation by the burner 18, the cross slide 15 is returned to its initial position by the reversible motor 16 whereupon the motor 16 is stopped. When the engaging member 21 is disengaged from the end of the sheet 45, the drive motor 23 is powered to drive the wheels 13 to return the front trimming mechanism 11 to the above-mentioned stand-by position, and the pneumatic cylinder 19 is actuated to raise the piston rod 19a to angularly move the engaging member 21 clockwise into its operative position as shown in FIG. 2. Then, another gas-cut sheet is delivered by the delivery rolls 46, and the above procedure is repeated. The distance between the burner 18 and the lower edge of the leading end of the sheet 45 can be adjusted by the power cylinder 17. The burner is movable toward and away from the lower edge of the sheet end by the cylinder 17. During the removal of the slag, the burner body is held against the lower edge under a predetermined load and moved therealong.

The above coordinate operations of drive motor 16 for cross slide 15, burner 18, power cylinder 19 for actuating engaging member 21, and drive motor 23 for wheels 13 are controlled through suitable detecting means such as limit switches (not shown).

As shown in FIG. 3, the burner 18 moves along the lower edge of the leading end of the sheet 45, for example, at a speed of 10 to 30 m per minute. When the sheet is maintained at elevated temperature, the burner 18 moves at a speed of 20 to 50 m per minute. The burner 18 applies a flame and a stream of oxygen gas from its rectangular orifice 18b to the slag 45a on the lower edge so that the slag is melted and completely removed from the sheet 45. Only the slag 45a is removed from the sheet 45 and therefore the sheet 45 is not affected by this trimming operation.

The rear trimming mechanism 25 is first located in a predetermined stand-by position as more fully described hereinafter. The engaging member 35 and the sensing member 38 are first held in their respective raised or inoperative positions by the power cylinders 33 and 40. The gas-cut sheet 45 is delivered by the delivery rolls 46 and passes the rear trimming mechanism 25. After the sheet 45 moves past the rear trimming mechanism 25, the drive motor 43 is powered to drive the wheels 27 so that the trimming mechanism 25 runs after the sheet 45 at a speed higher than the speed at which the sheet 45 moves. At the same time, the power cylinder 40 is actuated to angularly move the sensing member 38 counterclockwise into its lowered or operative position as shown in FIG. 5. At this time, the end 38a of the sensing member 38 pushes the actuator 42a of the limit switch 42 in a left hand direction (FIG. 5) to turn on the limit switch. Then, the rear trimming mechanism 25 catches up with the moving sheet 45 so that the end 38b of the sensing member 38 is caused to strike against the trailing end of the sheet 45 whereupon the sensing member 38 rebounds from the trailing end to turn off the limit switch 42. Upon deactivation of the limit switch 42, the pneumatic cylinder 33 is actuated to move the engaging member 35 into firm contact with the top surface of the sheet 45, as shown in FIG. 5. At this time, the drive motor 43 for the wheels 27 is stopped, and the rear trimming mechanism 25 is moved together with the sheet 45 through the engaging member 35 in engagement with the sheet 45. In this condition, the burner 31 is disposed beneath the lower edge of the trailing end of the sheet 45. During the movement of the rear trimming mechanism 25 with the sheet 45, the cross slide 28 is driven by the reversible motor 29 to slide along the cross beam 26b, so that the burner 31 moves along the lower edge of the trailing end of the sheet 45 to remove the slag 45a formed on the lower edge, as described above for the burner 18. After the burner 31 moves along the trailing edge from its one side to the other to complete the trimming operation, the burner 31 stops applying the flame and oxygen gas, and the power cylinder 33 is actuated to retract its piston rod 33a so that the engaging member 35 is brought out of engagement with the top surface of the sheet 45 to allow the sheet 45 to advance past the rear trimming mechanism 25, the sheet 45 being delivered by the delivery rolls 46. Upon completion of the trimming operation by the burner 31, the cross slide 28 is returned to its initial position by the reversible motor 29 whereupon the motor 29 is stopped. After the trimmed sheet 45 is delivered past the rear trimming mechanism 25, the reversible drive motor 43 is powered to drive the wheels 27 to return the rear trimming mechanism 25 to the above-mentioned stand-by position. When the engaging member 35 is brought into engagement with the sheet for movement therewith, the power cylinder 40 is actuated to angularly move the sensing member 38 clockwise (FIG. 5) to its raised or inoperative position. Another gas-cut sheet is delivered by the delivery rolls 46, and the above procedure is repeated. The distance between the burner 31 and the lower edge of the trailing end of the sheet 45 can be adjusted by the power cylinder 30 as described above for the burner 18.

The above coordinate operations of drive motor 43 for wheels 27, hydraulic cylinder 33 for engaging member 35, power cylinder 40 for sensing member 38, burner 31 and drive motor 29 for cross slide 28 are controlled through limit switch 42 and other associated detecting means such as limit switches (not shown).

The operation of the end trimming apparatus of the invention will be described with reference to FIGS. 6A to 6F.

Figure 6A:
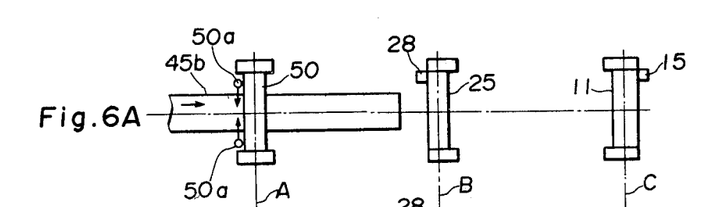
FIGS. 6A to 6F are schematic plan views sequentially showing a cycle of the trimming apparatus of the invention.
Figure 6B:
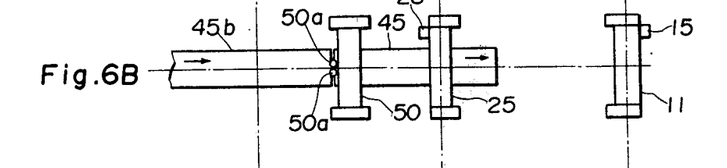
Figure 7:
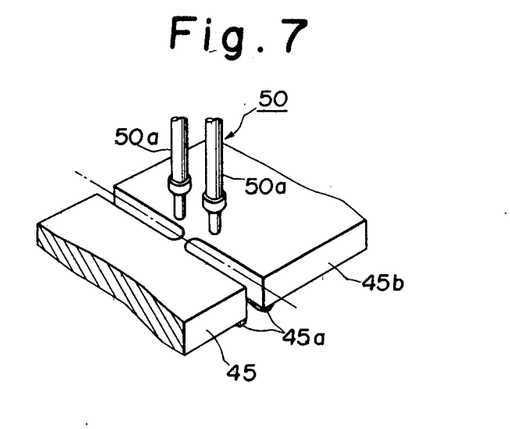
FIG. 7 is a perspective view of a cutting means showing the manner in which the sheet is cut by it.

As shown in FIG. 6A, a cutting device 50 and the rear and front trimming mechanisms 11, 25 are first located in their respective predetermined stand-by positions A, B and C. A sheet 45b of steel is continuously cast at a speed of 0.7 to 1.5 m per minute and delivered by rolls (not shown) along the pair of rails 14 in a right-hand direction (FIG. 6A). An end length of sheet 45b is fed past the stand-by position A where the cutting device 50 is located, until a preselected length has been advanced. Then, the cutting device 50 is moved together with the sheet 45b and starts cutting the preselected length of sheet 45b from the delivered end to provide a sheet or segment 45. The cutting device 50 comprises a pair of cutting torches 50a, 50a. The torches 50a, 50a are first disposed on opposite sides of the sheet 45b (FIG. 6A) and move toward each other to effect the cutting operation (FIG. 6B and FIG. 7).

The thus cut sheet 45 is delivered by rolls (not shown) at a speed higher than the speed at which the sheet 46b is cast or delivered. The delivery speed of the sheet 45 is, for example, 2 to 4 m per minute. This ensures that the gas-cut sheet 45 will not interfere with the delivery of the sheet 45b.

Figure 6C:
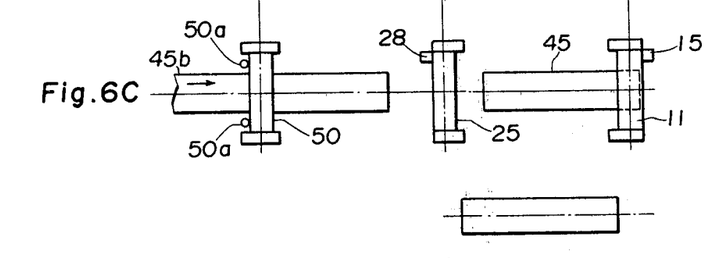
Figure 6D:
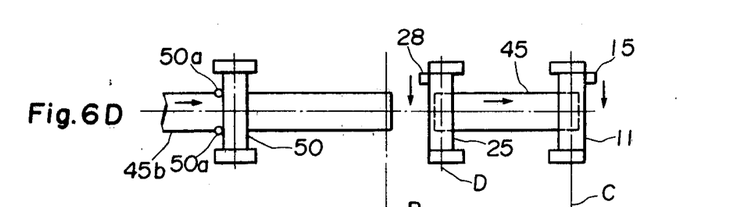
Figure 6E:
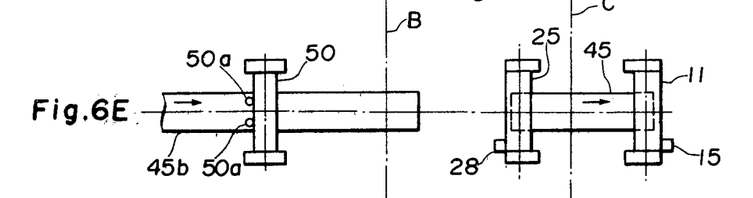
Figure 6F:
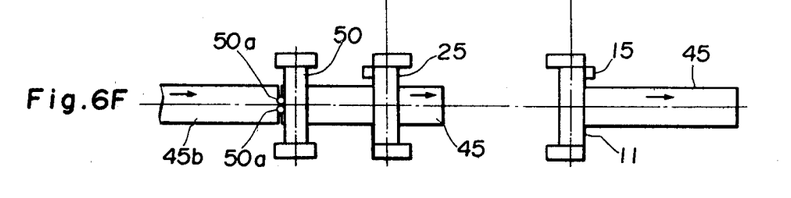

Then, the gas-cut sheet 45 passes the stand-by position B, and, as shown in FIG. 6C, the leading end of the sheet reaches the stand-by position C where the front trimming mechanism 11 is positioned. Prior to arrival of the leading end at the stand-by position C, the rear trimming mechanism 25 runs after the sheet 45 and soon catches up with the same at a position D, as shown in FIG. 6D. As a result, the front and rear trimming mechanisms 11 and 25 move together with the sheet 45 through their respective engaging members 21 and 35. During the movement of the two trimming mechanisms 11, 25 together with the sheet 45, the cross slides 15 and 28 move in a direction perpendicular to the longitudinal axis of the sheet 45 at a speed of 10 to 50 m per minute depending on the temperature of the sheet (FIG. 6D) so that the burners 18 and 31 move along the lower edges of the leading and trailing ends of the sheet 45, respectively, to remove the slags therefrom (FIG. 6E). After this trimming operation is completed, the front and rear trimming mechanisms 11 and 25 are returned to respective stand-by positions C and B to wait for a subsequently gas-cut sheet 45 for trimming the ends thereof. After the cutting device 50 cuts the preceding sheet 45, it is returned to its stand-by position A, as shown in FIG. 6C, and cuts the subsequent sheet 45.

Thus, the continuously fed sheet 45b is cut by the cutting device 50 to a preselected length, and the thus cut sheets 45 are subjected to the end trimming operation by the front and rear trimming mechanisms 11 and 25.

While the end trimming apparatus according to the invention has been specifically shown and described herein, the invention itself is not to be restricted by the exact showing of the drawings or the description thereof. For example, the gas-cut sheet 45 may be delivered at a higher speed and stopped. Then, the leading and trailing ends of the sheet 45 are trimmed by the front and rear trimming mechanisms 11, 25 while the sheet 45 is being stopped. In this case, the front and rear trimming mechanisms 11, 25 are stopped in position at the ends of the gas cut sheet through sensing means and the like. This system obviates the need for the engaging members 11, 25.

In the illustrated embodiment, the slags on the lower edges of the sheet ends are removed, but the burners 18, 31 may be so arranged that the slags on the upper edges are removed by the burners. Further, an additional burner may be mounted on the piston member 17a (30a) in opposed relation to the burner 18 (31) to simultaneously remove the slags on the upper and lower edges of the sheet end. Although the slag produced on the upper edge is much smaller in amount than that on the lower edge, it is desirable to remove the slag on the upper edge particularly when a final product of high quality is required.

Further, while the front and rear trimming mechanisms 11, 25 are employed in the illustrated embodiment, only one of them may be used depending on the situation.

Further, the continuous steel sheet 45b may be cut into the preselected length of sheet 45, using a plasm-arc cutting method.

Further, in the illustrated embodiment, the front and rear trimming mechanisms are moved together with the gas cut sheet through the respective engaging members. However, this operation may be carried out without using the engaging members. For example, the speed of movement of the gas cut sheet is electrically sensed through pinch rolls and a pulse generator so that the drive motors 23, 43 for the front and rear trimming mechanisms are driven to move the two mechanisms in synchronism with the movement of the sheet.

What is claimed is:

1. A trimming apparatus for removing a slag formed on an end of a sheet segment which has been cut from a continuous metal sheet by melting a localized area thereof, said apparatus comprising:
   (a) means for advancing the sheet segment; and
   (b) a trimming mechanism including a carriage movable along the path of travel of the sheet segment, and a burner mounted on said carriage and movable along the end of the sheet segment to remove the slag therefrom.

2. A trimming apparatus according to claim 1, further including means for moving said trimming mechanism in unison with the sheet segment.

3. A trimming apparatus according to claim 2, in which said moving means comprises an engaging member mounted on said carriage and engageable with the sheet segment.

4. A trimming apparatus according to claim 3, in which a cross beam is mounted on said carriage and extending perpendicular to the path of travel of the sheet segment, a vertically disposed cross slide being mounted on said cross beam for sliding movement therealong, and said burner being mounted on the lower end of said cross slide so that said burner is disposed beneath the lower edge of the end of the sheet segment when said engaging member is engaged with the sheet segment.

5. A trimming apparatus according to claim 3, in which said trimming mechanism constitutes a front trimming mechanism for removing the slag on the leading end of the sheet segment.

6. A trimming apparatus according to claim 5, in which said engaging member comprises a generally C-shaped member pivotally mounted on said carriage, said engaging member being operable to engage the leading end of the sheet segment at its one end.

7. A trimming apparatus according to claim 5, further including a rear trimming mechanism for removing the slag on the trailing end of the sheet segment, said rear trimming mechanism including a carriage movable along the path of travel of the sheet segment, an engaging member mounted on said carriage and engageable with the sheet segment, and a burner mounted on said carriage and movable along the trailing end of the sheet segment to remove the slag therefrom when said engaging member is engaged with the sheet segment.

8. A trimming apparatus according to claim 7, in which said engaging member of said rear trimming mechanism is operable to engage the top surface of the sheet segment.

9. A trimming apparatus according to claim 7, in which a sensing member is mounted on said carriage of said rear trimming mechanism, said sensing member being engageable with the trailing end of the sheet segment to actuate said engaging member into engagement with the sheet segment through a drive means.

10. A method of cutting a continuous metal sheet and trimming the end of the cut sheet, said method comprising the steps of:
    (a) cutting a sheet segment from the continuous metal sheet by melting a localized area thereof by a cutting means, while the metal sheet is being moved, a slag being formed on the end of the sheet segment;
    (b) delivering said sheet segment along a predetermined path; and
    (c) melting and removing the slag from the end of the sheet segment by a burner movable therealong, while the sheet segment is being delivered.

11. A method of cutting a continuous metal sheet and trimming the end of the cut sheet, said method comprising the steps of:
    (a) cutting a sheet segment from the continuous metal sheet by melting a localized area thereof by a cutting means, while the metal sheet is being moved, a slag being formed on the end of the sheet segment;
    (b) delivering said sheet segment along a predetermined path and stopping said sheet segment at a predetermined position;
    (c) melting and removing the slag from the end of the thus stopped sheet segment by a burner movable therealong; and
    (d) further delivering said sheet segment.

12. A method according to claim 10 or claim 11, in which the slags on both ends of the sheet segment are melted and removed therefrom simultaneously.

13. A method of removing a slag formed on an end of a sheet segment which has been cut from a continuous metal sheet by melting a localized area thereof, said method comprising the step of melting and removing the slag from the end of the sheet segment by a high-temperature flame and a stream of gas issuing from a burner movable along the slag, said burner having a nozzle portion having a flat surface in which an orifice is formed for applying the flame and the gas.

* * * * *